(12) United States Patent
Pinto et al.

(10) Patent No.: US 8,218,037 B2
(45) Date of Patent: *Jul. 10, 2012

(54) TECHNIQUES OF MODIFYING IMAGE FIELD DATA BY EXTRAPOLATION

(75) Inventors: Victor Pinto, Zychron-Yaakov (IL); Erez Galil, Sunnyvale, CA (US)

(73) Assignee: CSR Technology Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/903,114

(22) Filed: Oct. 12, 2010

(65) Prior Publication Data

US 2011/0025889 A1  Feb. 3, 2011

Related U.S. Application Data

(63) Continuation of application No. 12/140,257, filed on Jun. 16, 2008, now Pat. No. 7,817,196, which is a continuation of application No. 10/770,696, filed on Feb. 2, 2004, now Pat. No. 7,388,610, which is a continuation-in-part of application No. 10/222,412, filed on Aug. 16, 2002, now Pat. No. 7,408,576.

(51) Int. Cl.
  *H04N 9/64* (2006.01)
(52) U.S. Cl. .................... 348/241
(58) Field of Classification Search .......... 348/251, 348/241, 222.1; 358/3.09, 3.1
  See application file for complete search history.

(56) References Cited

U.S. PATENT DOCUMENTS

| | | | |
|---|---|---|---|
| 4,482,975 A | | 11/1984 | King et al. |
| 4,947,445 A | | 8/1990 | Sakamoto et al. |
| 5,047,861 A | * | 9/1991 | Houchin et al. ........... 348/247 |
| 5,181,098 A | | 1/1993 | Guerin et al. |
| 5,267,055 A | | 11/1993 | Sakamoto et al. |
| 5,343,302 A | * | 8/1994 | Yamashita ............... 348/251 |
| 5,621,824 A | * | 4/1997 | Ijiri et al. ................ 382/274 |

(Continued)

FOREIGN PATENT DOCUMENTS

EP  0720125 A1  7/1996

(Continued)

OTHER PUBLICATIONS

Wikipedia—the Free Encyclopedia, "Taylor Series", http://en.wikipedia.org/w/index.php? title=Taylor_series&direction=prev&oldid=2432603. Jan. 7, 2004, 3 pages.

(Continued)

*Primary Examiner* — Nicholas Giles

(74) *Attorney, Agent, or Firm* — Frommer Lawrence & Haug LLP; John W. Branch

(57) ABSTRACT

Techniques for modifying data of an image that can be implemented in a digital camera, video image capturing device and other optical systems are provided to correct for Image image shading variations appearing in data from a two-dimensional photo-sensor. These variations can be caused by imperfect lenses, non-uniform sensitivity across the photo-sensor, and internal reflections within a housing of the optical system, for example. In order to correct for these variations, a small amount of modification data is stored in a small memory within the camera or other optical system, preferably separate correction data for each primary color. Image data from individual pixels are corrected on the fly by interpolating individual pixel corrections from the stored modification data, at the same rate as the image data is being acquired, so that the correction takes place without slowing down data transfer of picture data from the image sensor.

18 Claims, 4 Drawing Sheets

U.S. PATENT DOCUMENTS

| | | | | |
|---|---|---|---|---|
| 5,675,380 | A | * | 10/1997 | Florent et al. ............... 348/251 |
| 5,784,100 | A | * | 7/1998 | Konishi ..................... 348/251 |
| 5,973,735 | A | | 10/1999 | Stekelenburg et al. |
| 6,195,469 | B1 | | 2/2001 | Nishioka et al. |
| 6,323,934 | B1 | | 11/2001 | Enomoto et al. |
| 6,833,862 | B1 | | 12/2004 | Li |
| 6,940,546 | B2 | * | 9/2005 | Gallagher ................. 348/224.1 |
| 7,098,945 | B1 | * | 8/2006 | Sasai et al. ................ 348/223.1 |
| 7,268,917 | B2 | | 9/2007 | Watanabe et al. |
| 7,408,576 | B2 | | 8/2008 | Pinto et al. |
| 2002/0025164 | A1 | | 2/2002 | Suzuki |
| 2002/0094131 | A1 | | 7/2002 | Shirakawa |
| 2002/0101522 | A1 | | 8/2002 | Hosier et al. |
| 2002/0135688 | A1 | * | 9/2002 | Niikawa ..................... 348/251 |
| 2002/0165890 | A1 | | 11/2002 | Thakur |
| 2003/0156190 | A1 | | 8/2003 | Sato et al. |
| 2003/0156204 | A1 | | 8/2003 | Sato et al. |
| 2003/0169345 | A1 | | 9/2003 | Rykowski et al. |
| 2003/0234864 | A1 | | 12/2003 | Matherson et al. |
| 2004/0095611 | A1 | | 5/2004 | Watanabe et al. |
| 2004/0257454 | A1 | | 12/2004 | Pinto et al. |
| 2005/0041806 | A1 | | 2/2005 | Pinto et al. |
| 2008/0273812 | A1 | | 11/2008 | Fujita et al. |

FOREIGN PATENT DOCUMENTS

| | | |
|---|---|---|
| JP | H03-262283 | 3/1990 |
| JP | H06-105143 | 4/1994 |
| JP | H09-069971 | 3/1997 |
| JP | H09-307789 | 11/1997 |
| JP | H10-142065 | 5/1998 |
| JP | H10-160566 | 6/1998 |
| JP | H11-075086 | 9/1999 |
| JP | 2000091923 | 3/2000 |
| JP | 2000253410 | 9/2000 |
| JP | 2001274973 | 10/2001 |
| JP | 2001275029 | 10/2001 |
| JP | 2002216136 | 8/2002 |
| JP | 2002237998 | 8/2002 |
| JP | 2002290829 | 10/2002 |
| JP | 2004023784 | 1/2004 |
| WO | 0227804 A2 | 4/2002 |
| WO | 02059837 | 8/2002 |
| WO | 02065760 | 8/2002 |
| WO | 2005043891 | 5/2005 |

OTHER PUBLICATIONS

Computer Organization and Design: The Hardware/Software Interface; Patterson, David A.; 1998; Morgan Kaufmann Publishers, Inc., 2nd Ed.; Chapter 4.6; pp. 250-253.
U.S. Appl. No. 10/222,412, Official Communication mailed Mar. 9, 2006.
U.S. Appl. No. 10/222,412, Official Communication mailed Apr. 20, 2007.
U.S. Appl. No. 10/749,669, Official Communication mailed Jul. 12, 2007.
U.S. Appl. No. 10/770,696, Official Communications mailed Jul. 12, 2007.
Chinese Patent Application No. 200480038566.8, "Notification of the First Office Action" dated Apr. 11, 2008.
Chinese Patent Application No. 200580003885.X, "Notification of First Office Action" dated Mar. 7, 2008.
European Patent Application No. 04814198.0; "Office Action" mailed Oct. 15, 2007.
European Patent Application No. 05705546.9; "Communication pursuant to Article 94(3) EPC" mailed Aug. 22, 2008.
Japanese Patent Application No. 2004-529235; "Notification of Reasons for Refusal" mailed Sep. 24, 2008.
International Patent Application No. PCT/US2003/024189; "International Search Report or the Declaration" mailed Nov. 12, 2003.
International Patent Application No. PCT/US2004/041987; "International Search Report and Written Opinion" mailed May 2, 2005.
International Patent Application No. PCT/US2005/000938; "International Search Report and Written Opinion" mailed Apr. 19, 2005.
U.S. Appl. No. 10/222,412, Official Communication mailed Sep. 8, 2006.
U.S. Appl. No. 10/222,412, Official Communication mailed Jan. 2, 2008.
U.S. Appl. No. 10/222,412, Notice of Allowance mailed Mar. 26, 2008.
U.S. Appl. No. 10/749,669, Notice of Allowance mailed Feb. 8, 2008.
U.S. Appl. No. 10/770,696, Notice of Allowance mailed Feb. 8, 2008.
U.S. Appl. No. 12/140,257, Official Communication mailed Jan. 4, 2010.
U.S. Appl. No. 12/140,257, Notice of Allowance mailed Jun. 10, 2010.
U.S. Appl. No. 12/144,616, Official Communication mailed Feb. 16, 2010.
U.S. Appl. No. 12/144,616, Notice of Allowance mailed Jul. 22, 2010.
U.S. Appl. No. 12/176,283, Official Communication mailed Mar. 23, 2010.
U.S. Appl. No. 12/176,283, Notice of Allowance mailed Aug. 25, 2010.
European Patent Application No. 04814198.0; "Communication pursuant to Article 94(3) EPC" mailed Jun. 1, 2010.
Japanese Patent Application No. 2006-547125; "Notification of Reasons for Refusal" mailed Aug. 10, 2009.
Japanese Patent Application No. 2006-547125; "Notification of Reasons for Refusal" mailed Apr. 27, 2010.
Japanese Patent Application No. 2006-552121; "Notification of Reasons for Refusal" mailed Jul. 27, 2010.
International Patent Application No. PCT/US2005/000938; "International Preliminary Report on Patentability" mailed Aug. 17, 2006.

* cited by examiner

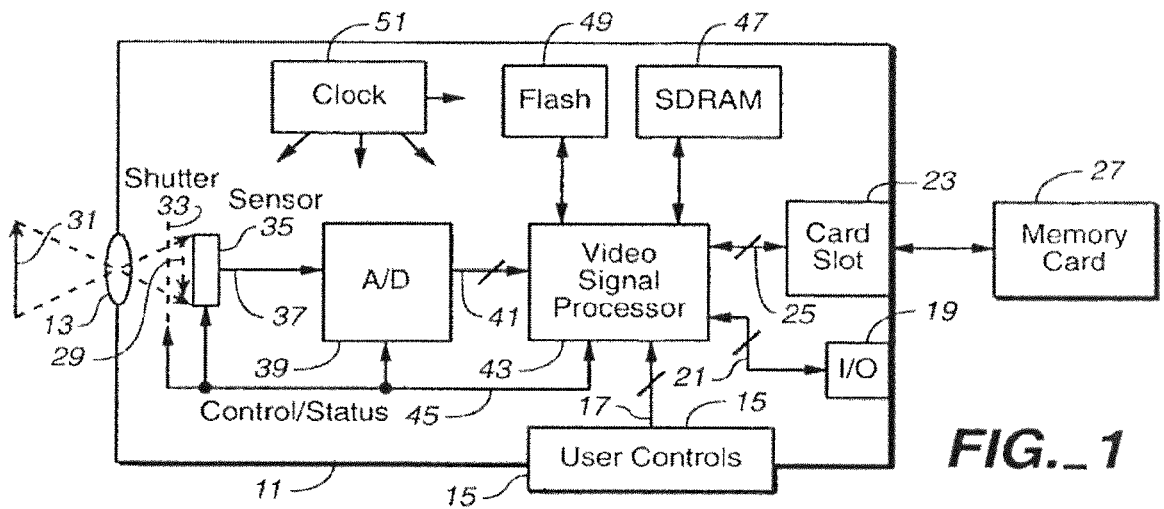
FIG._1
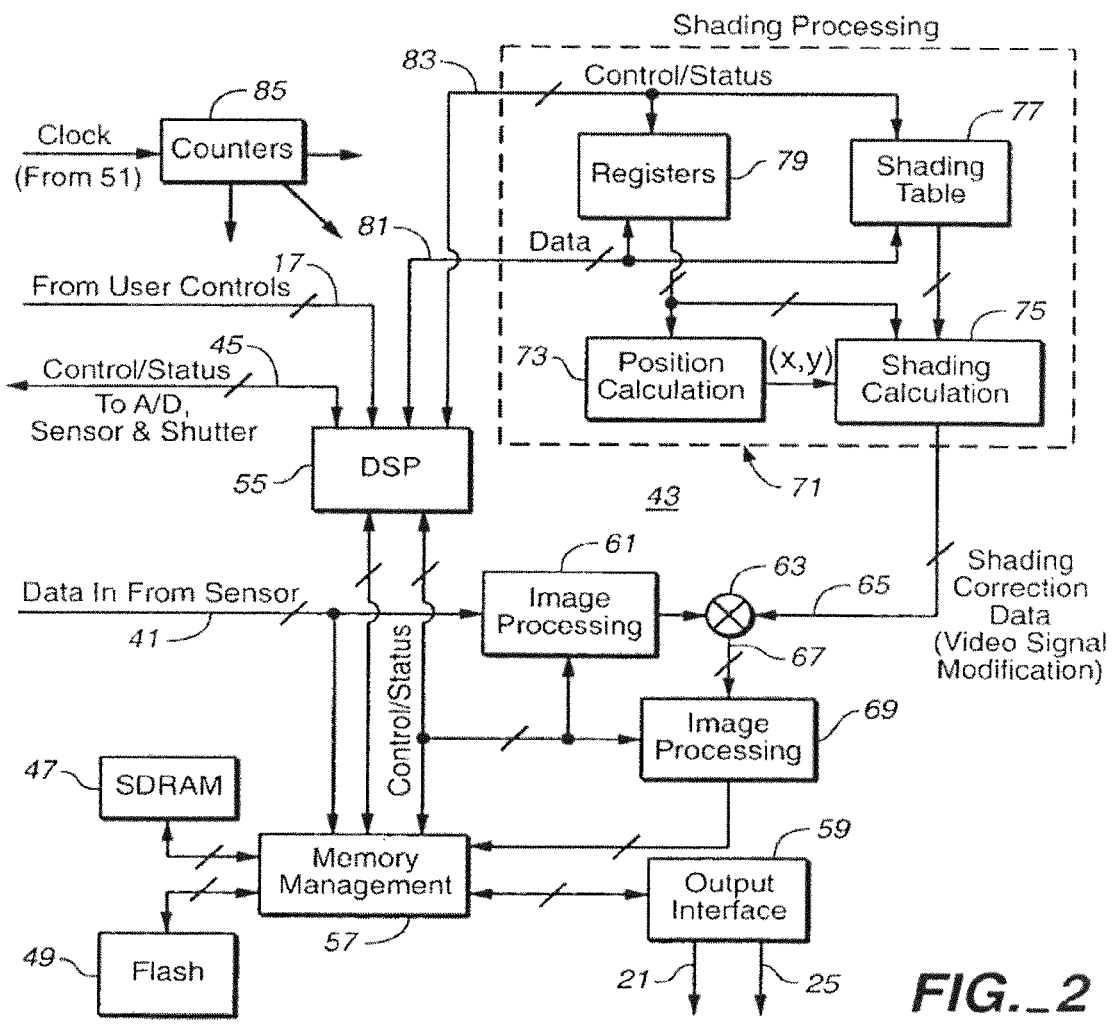
FIG._2

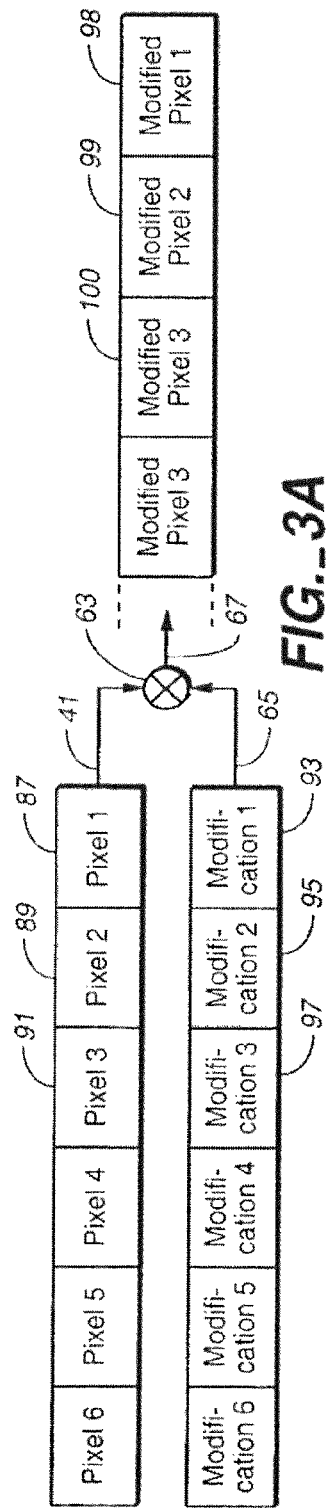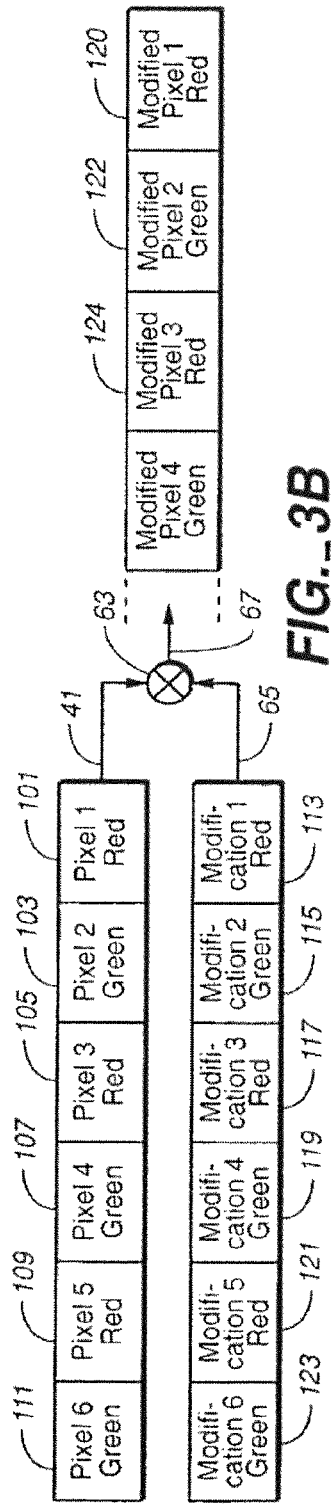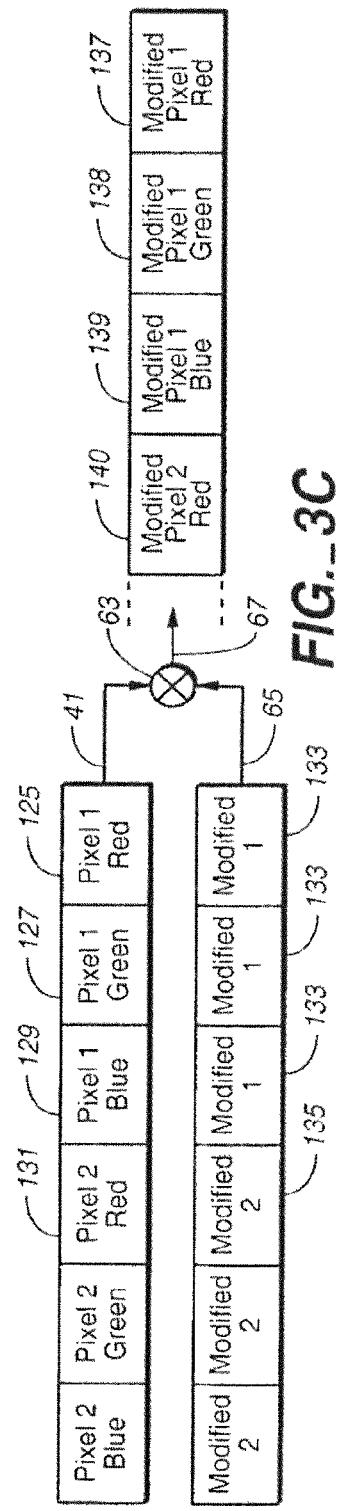

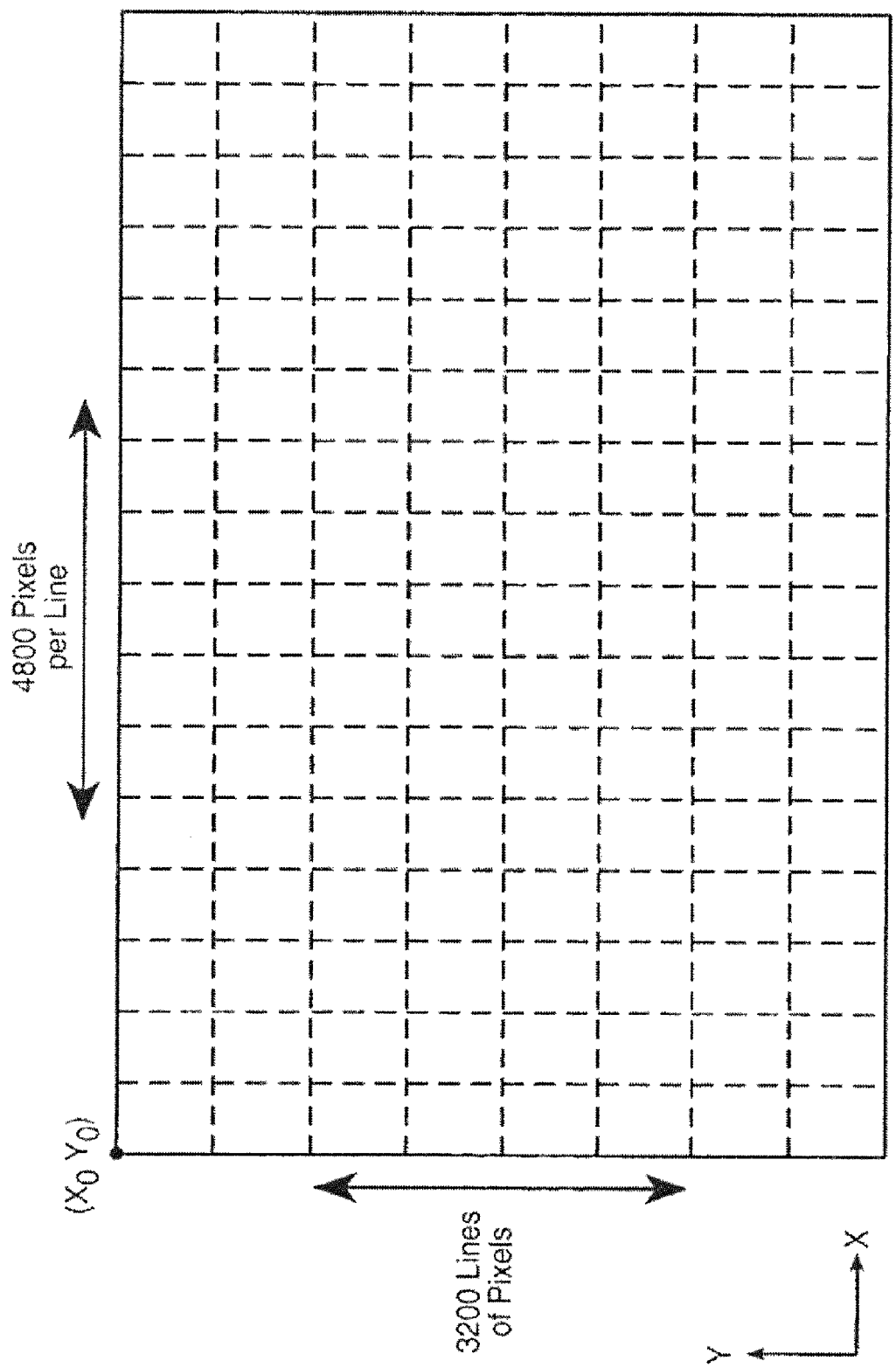

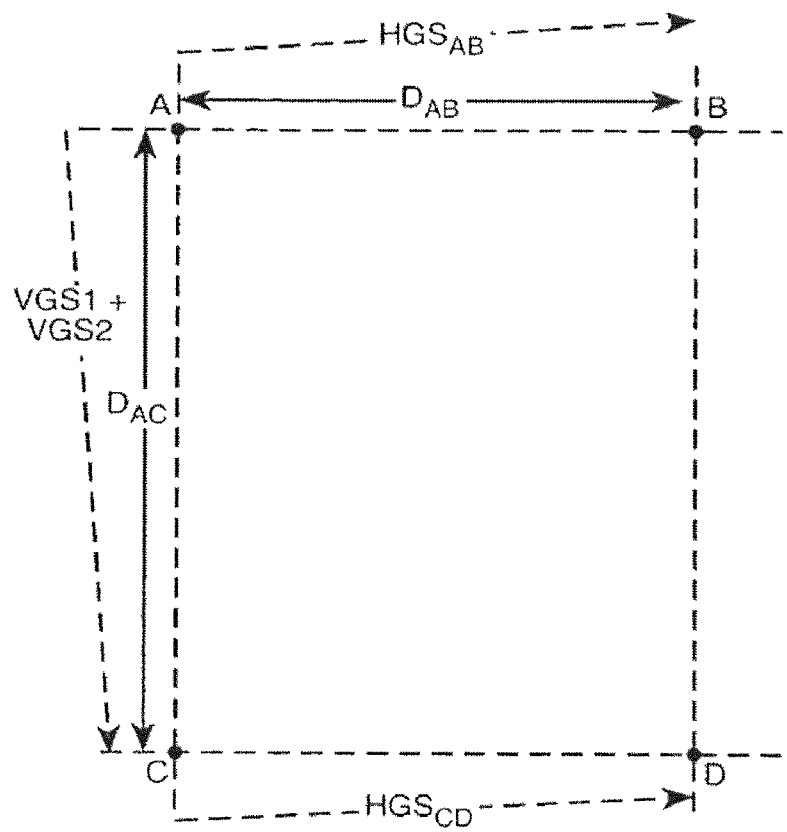
FIG._5
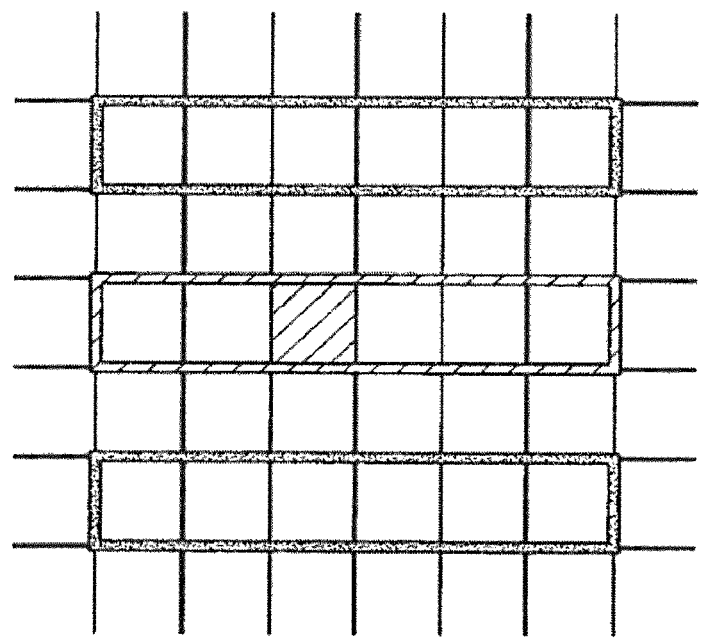
FIG._6

TECHNIQUES OF MODIFYING IMAGE FIELD DATA BY EXTRAPOLATION

CROSS-REFERENCE TO RELATED APPLICATIONS

This application is a continuation of allowed U.S. patent application Ser. No. 12/140,257, which is a continuation of U.S. Pat. No. 7,388,610 filed Feb. 2, 2004, which is a continuation-in-part of U.S. Pat. No. 7,408,576, filed Aug. 16, 2002. This continuation application is also related to U.S. Pat. No. 7,391,450, filed Dec. 30, 2003. All four of these patents and applications are expressly incorporated herein in their entirety for all purposes by this reference.

FIELD OF THE INVENTION

This invention relates generally to techniques of processing video signal data, and, more specifically, to processing video binary data to correct for variations across an imaged optical field such as, for example, to compensate for shading effects caused by lenses, sensor sensitivity variations and housing internal reflections in cameras and the like.

BACKGROUND

Image shading is a non-uniform light response across an image field. It can be attributed in an optical system to characteristics of a lens, sensitivity variations across a photo-sensor on which light is directed, improper alignment of a lens in relation to the image plane of the photo-sensor employed, internal cameral reflections, and possibly other factors that may be present in a particular system. In the case of a lens alone, a simple lens used to view a scene with a uniform light intensity across it will typically produce an image of that scene having a significantly non-uniform light intensity. The light intensity is normally highest in the middle of the image and falls off on its edges, as much as sixty percent or more. Such a lens obviously is not suitable for most optical applications without this effect being corrected. Correction can be provided by the use of a complex assembly of lenses that images scenes without imparting intensity variations across them.

Electronic cameras image scenes onto a two-dimensional sensor such as a charge-coupled-device (CCD), a complementary metal-on-silicon (CMOS) device or other type of light sensor. These devices include a large number of photo-detectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data of the intensity of radiation striking one sensor element after another as they are scanned. Color data are most commonly obtained by using photo-detectors that are sensitive to each of distinct color components (such as red, green and blue), alternately distributed across the sensor. Shading effects of lenses that image object scenes onto the photo-sensor, non-uniform sensitivity of the photo-sensor to various colors of light striking it, and potentially other factors, cause an uneven distribution of light across the photo-sensor, and thus video signals from the sensor include data of the undesired intensity variation superimposed thereon.

Rather than eliminating the lens shading effect by the use of a complex and expensive lens, along with an expensive and carefully selected image photo-sensor, it has been suggested that the signals from the photo-sensor may be processed in a manner to compensate for these effects. The amount of compensation applied to the signal from each photo-detector element is dependent upon the position of the element across the surface of the image photo-sensor.

SUMMARY OF THE INVENTION

The electronic signal processing techniques of the present invention allow compensation for lens shading and/or other similar phenomenon, such as sensor sensitivity variations and internal camera reflections, which collectively superimpose a variation onto a light pattern detected by a multi-element two-dimensional photo-sensor that may be measured and quantized. Such intensity shading compensation techniques have particular application to digital cameras and other types of video devices but are not limited to such optical photo system applications. The techniques may be implemented at a low cost, require a minimum amount of memory, and operate at the same rate as the video data being modified is obtained from the photo-sensor, thereby not adversely affecting the performance of the video system. This is accomplished by applying correction factors in real time to the output signals of the photo-sensor in order to compensate for an undesired fixed intensity variation across the photo-sensor.

In the two patent applications identified above in the Cross-Reference to Related Applications, shading variations across the image are compensated by characterizing those variations as one or more geometric shapes, such as circles, ellipses or hyperbolas, and then storing a small amount of data necessary to characterize the geometric shape or shapes. In a preferred form, data of an intensity shading variation is maintained as a function of radial position of each pixel from an optical center of the undesired intensity pattern. Such an "optical center" is alternatively referenced as a "center of gravity" or "anchor point." The radial position of each pixel is calculated in order by an algorithm involving primarily addition, which is a fast and simple way of calculating a correction factor for each pixel based on its radial position.

However, there are situations where it is too difficult or not practical to represent an intensity shading pattern with desired accuracy by one or a few simple geometric shapes. As an alternative, according to the present invention, the matrix of pixels of a photo-sensor can be logically divided into a grid of a large number of contiguous rectangular blocks that each contains a fixed number of pixels on a side. During calibration, data of the shading pattern on the individual blocks are calculated and stored, from which stored data a correction factor is calculated for the individual pixels as picture data are scanned from the photo-sensor, in real time, typically in a raster scanning pattern. The amount of memory necessary to store the shading intensity data of the blocks is significantly less than the amount of memory that would be necessary to store a correction factor for each pixel of the photo-sensor. The size and cost of the integrated circuits necessary for the camera or other picture acquisition device are thus reduced. Yet the level of correction and resulting quality of acquired picture data remain very good.

The individual pixel intensity adjustments are calculated from the reduced set of stored calibration data by interpolating that data. According to a specific implementation, rates of change (slope) of the shading intensity across the individual blocks of pixels are stored for both of the orthogonal X and the Y directions. The absolute intensity at a starting pixel of a scan, in the upper left-hand corner of the photo-sensor, is also stored. As the scan starts, the intensity of the pixels after the first is calculated from the stored slope values. This is preferably done by adding an intensity increment (which is a positive or negative number, depending upon the slope) to that of the immediately preceding pixel, where the increment is determined by the stored slope for the rectangle in which the current pixel resides. The use of addition and subtraction, instead of multiplication or division, makes it easier to implement, particularly when the calculation is being performed by dedicated logical circuits.

Each camera or other optical system is calibrated, in one example, by imaging a scene of uniform intensity onto the photo-sensor, capturing data of each pixel of a resulting intensity variation across the photo-sensor, logically dividing the pixel array into the grid of blocks and then calculating average rates of change of the intensity across each block. These relatively few intensity slope values, the characteristics of the pixel grid and the absolute intensity of the first pixel of each scanned frame, characterize the shading intensity variation across the photo-sensor with a reduced amount of data. It is usually desirable to acquire three sets of such data, one set for each primary color that is utilized in the picture processing.

Additional objects, advantages and features of the present invention are included in the following description of exemplary embodiments thereof, which description should be taken in conjunction with the accompanying drawings. Each patent, patent application, article or publication referenced herein is hereby incorporated herein in its entirety for all purposes by such reference.

BRIEF DESCRIPTION OF THE DRAWINGS

FIG. 1 schematically illustrates an electronic video device in which the techniques of the present invention may be utilized;

FIG. 2 is a block diagram of a portion of the electronic processing system of the device of FIG. 1;

FIGS. 3A, 3B and 3C illustrate the modification of three different types of video data by the system of FIG. 2;

FIG. 4 shows a logical organization of pixels of a photo-sensor into blocks that are used to calibrate and use the camera of FIGS. 1 and 2 with intensity shading correction factors stored on a block basis;

FIG. 5 is an example of one of the blocks of pixels of FIG. 4; and

FIG. 6 illustrates one of the calculations performed during calibration of a camera or other optical system of interest.

DESCRIPTION OF EXEMPLARY EMBODIMENTS

The superimposition of variations onto an image or other desired light pattern, due to the phenomena previously discussed, results in a variation of energy in each pixel of that light pattern. These energy variations are not related to the captured image or other picture data itself. In order to compensate for this variation in energy across the photo-sensor, each pixel value could be combined, such as by multiplication, with a shading correction density factor. This factor is unique to each pixel in the image sensor according to the pixel's geographic location in the image sensor matrix. In the ideal case, a table of factors could be created during a calibration procedure that stores the required compensation factor for each pixel of the image in memory. This would allow the needed shading compensation to be effected by executing the following equation with a processing unit in the image capturing device:

$$PixelOut = PixelIn * F(X, Y) \quad (1)$$

Where,

PixelOut=The output of the image shading compensation module; in other words the corrected pixel;

PixelIn=The input to the image shading compensation module. The pixel before correction; and $F(X,Y)$=The correction factor, which depends on the pixel's position expressed in terms of X and Y rectangular coordinates.

It would be very costly to implement the process defined by this equation on an integrated circuit with the storage of correction factors for each pixel of the photo-sensor. A large memory would be required to store a correction factor for each pixel and thus utilize a large area of silicon for the memory. Multiplication of the pixel values by the individual stored correction factors can further require a significant amount of silicon area for dedicated circuits to carry out the multiplication and/or can slow down the speed with which corrected data are obtained. Therefore, the techniques described herein employ unique approximations of this process that require very little memory and processing power but yet eliminate the undesired light patterns from the image. A reduced amount of data of the undesired intensity shading pattern (or the inverse, the shading correction factors) may be stored in one or more sparse two-dimensional lookup tables. A separate lookup table can be used for each color.

In the present description, shading correction factors for an optical photo system, (that is, the lens, image sensor, and/or housing) of a digital camera, video capturing device or other type of digital imaging device, are derived during a calibration procedure. This calibration is performed by imaging a scene of uniform intensity onto the photo-sensor employed by the device being calibrated, also using its lens system and housing. The individual pixel intensity values are captured and the slope values for the individual rectangles of the grid across the photo-sensor are calculated and stored in a memory within the device being calibrated. Since the complete optical photo system of the digital imaging device is employed during the calibration procedure, these techniques correct for any intensity variations caused by the image sensor and/or its interaction with the incident image light, in addition to correcting for non-uniformities due to lens shading alone.

Optical Device Example

An implementation of the techniques of the present invention is described in a camera or other video acquisition device, where digital data of the image(s) or other captured light pattern(s) are modified on the fly to compensate for intensity modifications superimposed across the image by the camera's optical system, photo-sensor and reflections from internal camera surfaces. In FIG. 1, such a camera is schematically shown to include a case 11, an imaging optical system 13, user controls 15 that generate control signals 17, a video input-output receptacle 19 with internal electrical connections 21, and a card slot 23, with internal electrical connections 25, into which a non-volatile memory card 27 is removably inserted. Data of images captured by the camera may be stored on the memory card 27 or on an internal non-volatile memory (not shown). Image data may also be outputted to another video device through the receptacle 19. The memory card 27 can be a commercially available semiconductor flash electrically erasable and programmable read-only-memory (EEPROM), small removable rotating magnetic disk or other non-volatile memory to which video data can be programmed by the camera. Alternatively, particularly when the camera is taking movies of thirty image frames per second or the like, larger capacity storage media can be used instead, such as magnetic tape or a writable optical disk.

The optical system 13 can be a single lens, as shown, but will normally be a set of lenses. An image 29 of a scene 31 is formed in visible optical radiation through a shutter 33 onto a two-dimensional surface of an image sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual blocks of digital data representing the intensity of light striking the individual photo-detectors of the sensor 35.

Processing of the video data in circuits 41 and control of the camera operation are provided, in this embodiment, by a single integrated circuit chip 43. In addition to being connected with the circuits 17, 21, 25 and 41, the circuit chip 43 is connected to control and status lines 45. The lines 45 are, in turn, connected with the shutter 33, sensor 29, analog-to-digital converter 39 and other components of the camera to provide synchronous operation of them. A separate volatile random-access memory circuit chip 47 is also connected to the processor chip 43 for temporary data storage. Also, a separate non-volatile re-programmable memory chip 49 is connected to the processor chip 43 for storage of the processor program, calibration data and the like. A usual clock circuit 51 is provided within the camera for providing clock signals to the circuit chips and other components. Rather than a separate component, the clock circuit for the system may alternatively be included on the processor chip 43.

A functional block diagram of the processor chip 43 is shown in FIG. 2. A digital signal processor (DSP) 55 is a key component, controlling both the operation of the chip 43 and other components of the camera. But since the DSP 55 does not extensively process video data, as discussed below, it may be a relatively simple and inexpensive processor. A memory management unit 57 interfaces the DSP 55 to the external memory chips 47 and 49, and to output interface circuits 59 that are connected to the input-output connector 19 and to the card slot 23 (FIG. 1) through respective circuits 21 and 25.

The flow of video data through the block diagram of FIG. 2 from the analog-to-digital converter 39 (FIG. 1) is now generally described. The input data in lines 41 is pre-processed in a block 61 and then provided as one input to a multiplier circuit 63. Another input 65 to the multiplier 63 carries data that modifies the incoming video data, the modified video data appearing at an output 67 of the multiplier 63. In this example, the modification data in lines 65 correct for the effects of lens shading and intensity variations imparted across the image by camera elements. After further image processing 69, as appropriate, the video data are directed through the memory management unit 57 to the output interface circuits 59 and then through either lines 21 to the input-output receptacle 19 or through lines 25 to the memory card slot 23 (FIG. 1), or both, of the camera for display and/or storage.

The correction data in lines 65 are generated by a block of dedicated processing circuits 71. The block 71 includes circuits 73 that provide the (X, Y) position of each image pixel from which video data are currently being acquired. This pixel position is then used by a calculation circuit 75 to generate the modification factor applied to the multiplier 63. A memory 77 stores a look-up table. In order to reduce the size of the memory 77, only a small amount of correction data are stored in the look-up table and the circuits 75 calculate the correction values of individual pixels from such data. A set of registers 79 stores parameters and intermediate results that are used by both of the calculation circuits 73 and 75.

The calculation circuits 73 and 75 operate independently of the DSP 55. The DSP could possibly be used to make these calculations instead but this would require an extremely fast processor, if sufficient speed were even available, would be expensive and would take considerable more space on the chip 43. The circuits 73 and 75, dedicated to performing the required repetitive calculations without participation by the DSP 55, are quite straightforward in structure, take little space on the chip 43 and frees up the DSP 55 to perform other functions.

The memory or memories 77 and 79 storing the image modification data and parameters are preferably a volatile random-access type for access speed and process compatibility with other processor circuits so that they can all be included on a single cost effective chip. The image modification data and parameters are generated once for each camera at a final stage of its manufacture and then are permanently stored in the non-volatile memory 49. These data are then loaded through lines 81 into the memories 77 and 79 each time the system is initialized, under control of the DSP 55 operating through control and status lines 83.

With reference to FIG. 3A, one aspect of the operation of the system of FIG. 2 is explained where the sensor 35 (FIG. 1) includes a single photo-detector for each image pixel. The digitized output 41 of the sensor includes successive blocks 87, 89, 91, etc. of data from adjacent photo-detectors of the sensor 35 in one row. Each block of data, containing 10, 12 or more bits that quantify the intensity of one pixel of the image 29 being sensed by a single photo-detector element, appears in the circuits 41 at a rate controlled by the system clock 51 through controlling counters 85 (FIG. 2). One of the data blocks 87, 89, 91, etc. can appear during each cycle of a clock signal, for example.

Data blocks 93, 95, 97, etc. are generated by the modification processing circuits 71 (FIG. 2) at the same rate and in synchronism with the image data 87, 89, 91, etc. That is, the modification data 93 are generated to appear at the multiplier 63 at the same time as the image data 87, and so on. Since the scanning pattern of the photo-detectors is known, the calculating circuits 73 generate the radii of the positions of the photo-detectors across the surface of the sensor 35 in the same order and at the same rate as the image data is read out from those photo-detectors. Modification factor data generated for a particular image pixel is then combined with data of the intensity of that pixel. Combination in the multiplier 63 of image data 87 with the generated modification data 93 for the same pixel results in modified data 98. Modified data blocks 99 and 100 are similarly obtained by combinations of data 89 and 95, and 91 and 97, respectively.

The usual video system processes data for each of multiple distinct color components of the image. A typical commercial sensor alternates photo-detectors along the rows that are covered with red, green and blue filters. There are several different arrangements of the color sensitive photo-detectors that are commercially used. In one such arrangement, one row contains alternating red and green sensitive photo-detectors, while the next row contains alternating blue and green sensitive photo-detectors, the photo-detectors also being positioned along the rows to provide alternating color sensitivity in columns. Other standard arrangements use other combinations of two alternating colors. As indicated in FIG. 3B, the output in lines 41 of one such sensor include successive pieces of red, green and blue data. Blocks 101, 103, 105, etc. represent separate data of alternating red and green sensitive photo-detectors, one block being outputted during each of successive clock cycles.

If there is only one set of correction data for all of the discrete colors being detected, an image modification factor is generated for each image pixel from that set of data, regardless of the color. This is quite adequate in cases where the variation across the image that is being removed by the signal modification affects all colors to the same or nearly the same degree. However, where the variation is significantly color dependent, separate correction factors are used for each color component. Use of color dependent modification is illustrated in FIG. 3B, wherein the successive modification factors 113, 115, 117, etc. are combined with each successive block of image data 101, 103, 105, etc. The result is modified data blocks 120, 122, 124 etc. The modification factors 113, 117, 121, etc. are taken from red correction data, while the modification factors 115, 119, 123, etc. come from green correction data.

One particular type of photo-sensor that is commercially available stacks multiple photo-detectors at each photo-site or pixel. The top detector passes the colors red and green, while filtering out the color it is sensitive to, for example blue. The detector immediately beneath this top detector passes the color green and filters out the color it is sensitive to, in this example red. The bottom sensor is then sensitive to the color green. FIG. 3C illustrates operation of the system of FIG. 2 with this type of sensor. Blocks of data 125, 127, 129, 131, etc. are outputted, three for all the colors of one pixel, another three for the next adjacent pixel, and so on. If only one set of correction data is maintained for all colors, the same modification factor is combined with the three data blocks from each photo-site, such as the modification factor 133 for the site generating the color data blocks 125, 127 and 129. If separate correction data are maintained for each color, the modification factors can be different but all three are calculated for a single radial position across the image sensor. When combined in the multiplier 63, successive modified data blocks 137, 138, 139 etc. result.

Other types of color systems can also be corrected by the techniques described herein. There was a commercial color system, for example, that used only two color components. Also, there are four-color systems in which a separate detector with a wide spectral range is used to acquire "black and white" information.

Shading Correction Processing

In the 2-dimensional surface extrapolation approach of the present invention, a two-dimensional subset of shading correction factors is kept. These correction factors are used to interpolate the value of the shading correction factor for most all of the pixels in the two-dimensional image plane.

FIGS. 4 and 5 provide a framework for the following discussion. A photosensor is schematically illustrated in FIG. 4 with its large number of pixels logically divided into rectangles of a grid pattern that is shown in dashed outline. A specific example of 4800 horizontal pixels per line and 3200 vertical lines is described, for a total of 15,360,000 pixels in the display. The grid pattern includes 16 blocks horizontally and 8 blocks vertically. FIG. 5 shows one of the rectangles of the grid pattern of FIG. 4 in an expanded view. Each block in the specific example contains 300 pixels horizontally and 400 lines of pixels vertically. The shape and number of rectangles shown in the grid pattern and the number of pixels illustrated in FIGS. 4 and 5 need not, of course, be limited to the numbers selected for illustration of a specific example.

One way to determine the correction factor for individual pixels, without having to store such factors for all pixels of the array, is to store them for a representative few of the pixels in each block and then calculate the correction for other individual pixels by interpolation, linear or otherwise. That is, the size of the blocks of the grid pattern of FIGS. 4 and 5 are made small enough such that the intensity variation of the shading pattern across an individual block may be predicted from a few stored values in the block. For each pixel location, the correction factor is extrapolated from this stored subset according to the following equation:

$$\text{PixelOut} = \text{PixelIn} * F[(X,Y) \text{location, stored subset of correction values}] \quad (2)$$

Where,

PixelOut=The output of the image shading processing module 71; in other words, the corrected pixel;

PixelIn=The input to the image shading processing module 71; in other words, the pixel before correction; and $F[\ldots]$=The correction factor, which is a function of the pixel location (X, Y) and a subset of the shading correction values stored in the memory 77 for a few pixels of the block in which the corrected pixel lies.

In this case, the correction factor extrapolation formula is implemented as a two dimensional extrapolation responsive to the geometric distance between the pixel of interest at a current location, and neighboring pixels that are represented by a shading correction factor stored in a limited table of correction factors. The values of correction factors $\text{Gain}_A$, $\text{Gain}_B$, $\text{Gain}_C$ and $\text{Gain}_D$, for the corner pixels A, B, C and D of FIG. 5 respectively, may be stored in memory. The corrected value of the image intensity at a pixel P, the pixel of interest within a block between points A, B, C and D, can then be extrapolated as:

$$\text{Corrected PixelOut at Point } P = (\text{Uncorrected PixelIn at Point } P) * \text{Gain}_P \quad (3)$$

Where, $\text{Gain}_P$, the shading correction factor gain at point P, may be expressed as:

$$\text{Gain}_P = \tfrac{1}{2}[\text{Gain}_A * (\text{Distance}(A,P)/\text{Distance}(A,C)) + \text{Gain}_B * (\text{Distance}(B,P)/\text{Distance}(B,D)) + \text{Gain}_C * (\text{Distance}(C,P)/\text{Distance}(A,C)) + \text{Gain}_D * (\text{Distance}(D,P)/\text{Distance}(B,D))] \quad (4)$$

Where Distances (A,P), (B,P), (C,P) and (D,P) are the geometric distances between pixels A, B, C and D and the pixel P of interest, respectively, and Distances (A,C) and (B,D) are the respective geometric distances between corner pixels A and C, and between corner pixels B and D. These distances are most conveniently measured in units of a number of pixels.

The cost of implementing this process in the form of an integrated circuit is high, however, because of the large number of multiplication operations that are required and the need to include a large number of shading correction factor gains on the integrated circuit, the number of shading correction factor gains being directly proportional to the number of pixels in the photo-sensor. Correction factors for each of the corner pixels of the rectangles of FIG. 4 would have to be stored. But by storing changes between shading correction factor gains of adjacent block corner points in the table, instead of absolute values of the gains themselves, and by employing adders along with a set of registers to store intermediate computation data, the number of multiplications required, and thus the cost, of integrated circuit implementation are significantly reduced.

The use of correction factor gain changes, or slopes, instead of the shading correction factor gains themselves comes from the fact that, for example, in a digital camera, the non-uniform light response of a lens or a photo-sensor can cause the intensity of an image to change in both horizontal and vertical directions, such that it is lower at the start of a horizontal line or a vertical column than in the center of the line or column, and once again higher at the end of the line or column. In order to capture, store and display an image with a uniform luminosity at the time a scene is captured, changes of luminosity across the photo-sensor are stored at the time of calibration, and these measurements are used to subsequently compensate for these changes.

For the purposes of a specific example, the area of the photo-sensor that receives the image or other light pattern to be corrected is logically divided into the number of blocks shown in FIG. 4. This provides a total of 16 horizontal borders and 8 vertical borders between blocks and around the edges of the image. A coarser or finer image division can be used. The range of blocks chosen should coincide with the maximum pixel resolution supported by the photo-sensor's interface counters. Block boundaries extend across the full optical image size of the photo-sensor, no matter what portion of the image is taken into the video signal processing unit 43 (FIG. 1) for processing.

At calibration time, a light field of uniform intensity across it is directed onto the photo-sensor through the optical system of the camera or other optical device. Luminosity changes across the calibrating light distribution are measured at the photo-sensor output by calculating a dX slope, a dY slope and a second partial slope dXY of the shading intensity in every block. Thus, a dX slope of a block represents the change of light intensity across the top line of pixels of the block and the dXY slope represents the change of dX slope between successive lines, going from top to bottom lines of pixels of a block. For example, the luminosity change of line i of the block is represented by a sum of dX slope with i*dXY slope of the block. The dY slope represents the luminosity change in the vertical direction between the successive blocks that comprise the first column of the image. Three slope tables are formed from these measurements and included in the digital image capturing device and used for image shading correction. They are:

1) HGST (Horizontal Gain Slope Table)—A change in X (dX) slope table, which has 128 entries (16×8) in the particular example, one for each of the blocks of FIG. 4, each entry having 22 bits (1 sign, 21 fraction).
3) VGST1 (Vertical Gain Slope Table 1)—A change in Y (dY) slope table, which has 8 entries, one for each row of blocks of FIG. 4, each entry being 22 bits wide (1 sign, 21 fraction).
2) VGST2 (Vertical Gain Slope Table 2)—A second partial derivative of the change in X (dXY) slope table, which has 128 entries, each entry is 17 bits wide (1 sign bit, 16 fraction bits).

The table HGST specifies, for each block in the image, the slope of the gain for each pixel (HGS) in the block. In other words, it specifies the difference between the gain of pixel x and the gain of the next pixel x+1 along a horizontal scan line within a block as shown in FIG. 5. More specifically, the incremental difference in gain per pixel (slope) $HGS_{AB}$ along the horizontal line between points A and B is $$HGS_{AB} = (Gain_B - Gain_A)/D_{AB} \quad (5)$$

and the quantity $HGS_{CD}$ is the slope along the horizontal line between points C and D of a block such as illustrated in FIG. 5:

$$HGS_{CD} = (Gain_C - Gain_D)/D_{CD} \quad (6)$$

Where $D_{AB}$ is the distance between points A and B measured in a number of pixels, and $D_{CD}$ is the distance between points C and D of FIG. 5. In a specific example, each of these quantities, which are part of the HGST table stored in the memory 77 (FIG. 2) during operation of the camera, is expressed as a 22 bit wide binary number (1 sign bit and 21 fraction bits).

The table VGST1 contains one entry for each row of the blocks of FIG. 4. It specifies for each first block in a row of blocks, the vertical slope of the gain for all pixels in this first block. In other words, it specifies the difference between the gain of pixel (0,Y) to the gain of an adjacent pixel (0,Y+1) in the same column adjacent the left edge of the block. This incremental difference in gain per pixel (slope) $VGS_{AC}$ may be expressed as:

$$VGS1 = (Gain_C - Gain_A)/D_{AC} \quad (7)$$

where $D_{AC}$ is the distance between corner pixels A and C, measured as a number of pixels. In this example, each entry in the table is a 22 bit wide binary number (1 sign bit and 21 fraction bits).

The table VGST2 contains one entry for each block that makes up the image. It specifies for each block, the vertical slope of HGS (this is a second derivative) for each line in the block. In other words, it specifies the difference between the HGS of the first pixel in line y, and the HGS of the first pixel in the next in order line y+1. This incremental difference in gain per pixel (slope) $VGS_{AC}$ may be expressed as:

$$VGS2 = (HGS_{CD} - HGS_{AB})/D_{AC} \quad (8)$$

In this example each entry in the table is a 17 bit wide binary number (1 sign bit and 16 fraction bits).

The calibration procedure also supplies a "Basic Gain" which is included in the digital image capturing device. Basic gain is the gain of the first block of the image and it is used in the image shading correction process as the gain factor for the top left pixel $(X_0, Y_0)$ of the image, as illustrated in FIG. 4. In this example, the gain is represented as a 26 bit wide binary number (2 integral bits and 24 fraction bits).

The basic gain of the reference pixel $(X_0, Y_0)$ and the entries stored in tables HGST and VGST1 provide all the data necessary to calculate the gain of the correction factors for each of the pixels in the display, which gains are combined with the output values read from each of the pixels. The additional table VGST2 provides data that makes this calculation and combination faster to perform.

In the detailed description of the steps that follows, as delineated in Table A below, the following terms are used, along with the terms defined above:

Progressive Image Format In progressive image format the image is operated on as a single frame. In other words, lines of the image are acted on in sequential order. Line 1 of the image is processed or displayed first, followed by line two of the image, followed by line 3 of the image, etc.

Interlaced Image Format In interlaced image format the image is divided into two fields: field 1 holds the even lines (0, 2, . . . ) and field 2 holds the odd lines. When processing or processing an interlaced image, lines 1, 3, 5, 7 etc. are processed or displayed first, followed by lines 2, 4, 6, 8 of the image. Although a 2 field interlacing formal is used throughout this discussion as an example, the present invention is effective on images divided in 3, 4, 5 or more separate fields.

Reg[ ] An array of 16 registers that accumulates (VGS2)*(the line number in the block in which the current pixel of interest is located). Each register is a 26 bit wide binary number (1 sign, 1 integral, 24 fraction).

CurrentVGS, CurrentHGS The VGS and HGS that applies to the current block, the block in which the pixel of interest resides. For instance, if a pixel is in the (i,j) block then CurrentVGS2=VGST2(i,j) and CurrentHGS=HGST(i,j).

CurrentVSize The vertical size of the current block (taken from the Block Boundaries LUT).

CurrentLine The vertical offset from the start of the current block.

CurrentGain The gain to multiply the intensity value of the current pixel by in order to effect pixel shading correction. In this example CurrentGain is a 26 bit binary number (2 integral, 24 fraction).

LineStart Register Stores the gain at line start. In this example LineStart is a 26 bit binary number (2 integral, 24 fraction).

AddH Register Add the contents stored in the AddH register to the CurrentGain each time the pixel of interest shifts one pixel to the right in the image being corrected. In this example, the contents of AddH is a 26 bit binary number (1 sign, 1 integral, 24 fraction).

Tmp Register Normalize and store the CurrentGain value in the Tmp register. Then multiply the intensity value of the current pixel, the uncorrected PixelIn, by the normalized CurrentGain value in the Tmp register to effect shading correction and create the corrected PixelOut. In this example Tmp is a 10 bit binary number (2 integral, 8 fraction).

The correction calculations made for each pixel are responsive to the specific position of the pixel in the image as a whole, which is in a particular block of the image and in a defined line of the image. Table A delineates the shading correction effected for each pixel, in each block, as a function of pixel position and image format. It assumes, as an example implementation, the use of a digital signal-processing engine implemented in the form of an integrated circuit.

TABLE A

Shading Correction Method Steps

| Pixel Position | Progressive Image Format | Interlaced Image Format Field 1 | Interlaced Image Format Field 2 |
|---|---|---|---|
| First Pixel In The Image | LineStart = BasicGain<br><br>CurrentGain = LineStart<br><br>Reg[0] = 0 | | LineStart = BasicGain + CurrentVGS1 Limit(LineStart, 0, $2^{26}-1$)<br><br>Reg[0] = CurrentVGS2 |
| | AddH = Reg[0] + CurrentHGS<br>Tmp = (CurrentGain + 0x8000)>>16<br>PixelOut = Limit((PixelIn * Tmp + 128)>>8, 0, 1023)<br>CurrentGain = CurrentGain + AddH Limit(CurrentGain, 0, $2^{26}-1$)<br>LineStart = LineStart + CurrentVGS1 Limit(LineStart, 0, $2^{26}-1$) | LineStart = LineStart + (CurrentVGS1*2) | LineStart = LineStart + (CurrentVGS1* 2) |
| First Pixel In a Line | CurrentGain = LineStart<br>If it's the first line in the block<br>Then Reg[0] = 0<br>Else<br>{<br>Reg[0] = Reg[0] + CurrentVGS2 Limit(Reg[0], $-2^{25}$, $2^{25}-1$)<br>} | {<br>Reg[0] = Reg[0] + (CurrentVGS2*2)<br>} | Then Reg[0] = CurrentVGS2<br>Else<br>{<br>Reg[0] = Reg[0] + (CurrentVGS2*2)<br>} |
| | AddH = Reg[0] + CurrentHGS Limit(AddH, $-2^{25}$, $2^{25}-1$)<br>Tmp = (CurrentGain + 0x8000)>>16<br>PixelOut = Limit((PixelIn*Tmp + 128)>>8, 0, 1023)<br>CurrentGain = CurrentGain + AddH Limit(CurrentGain, 0, $2^{26}-1$)<br><br>LineStart = LineStart + CurrentVGS1 Limit(LineStart, 0, $2^{26}-1$) | LineStart = LineStart + (CurrentVGS1*2) | If it's the last line in a block<br>LineStart = LineStart + CurrentVGS1 + NextVGS1<br>Else<br>LineStart = LineStart + (CurrentVGS1 * 2) |
| First Pixel In Block j (j≠0) | If it's the first line in the block<br>Then Reg[j] = 0<br>Else<br>{<br>Reg[j] = Reg[j] + CurrentVGS2 Limit(Reg[j], $-2^{25}$, $2^{25}-1$)} | Reg[j] = Reg[j] + (CurrentVGS2*2) | Then Reg[j] = CurrentVGS2<br>Else<br>{<br>Reg[j] = Reg[j] + (CurrentVGS2 * 2) |

TABLE A-continued

Shading Correction Method Steps

| Pixel Position | Progressive Image Format | Interlaced Image Format Field 1 | Interlaced Image Format Field 2 |
|---|---|---|---|
|  | AddH = Reg[j] + CurrentHGS<br>Limit(AddH, $-2^{25}$, $2^{25} - 1$)<br>Tmp = (CurrentGain + 0x8000)>>16<br>PixelOut = Limit(<br>(PixelIn*Tmp + 128)>>8, 0, 1023)<br>CurrentGain = CurrentGain + AddH Limit(CurrentGain, 0, $2^{26} - 1$) |  | } |
| Other (Regular) Pixels | Tmp = (CurrentGain + 0x8000)>>16<br><br>PixelOut = Limit(<br>(PixelIn*Tmp + 128)>>8, 0, 1023)<br>CurrentGain = CurrentGain + AddH Limit(CurrentGain, 0, $2^{26} - 1$) |  |  |

Shading Compensation Calibration

Image data from a uniformly lighted completely white image of uniform intensity across it is captured by the camera being calibrated, while the shading correction stage of this camera bypassed. In the specific example, this calibration image is divided into 16 horizontal blocks by 8 vertical blocks. A total of 16 horizontal and 8 vertical block boundaries are programmed by the calibration test operator at the time of camera production, by the use of a calibration program executing on the camera system's controller or video signal processor. The number of blocks, and thus the range of block numbers, is chosen to match the maximum pixel resolution supported by the camera photo-sensor interface counters. For photo-sensors in common use today, the maximum block size will be about 300×400 (horizontal×vertical) pixels and the minimum block size will be 30×30 pixels. Therefore, the blocks will normally each have from 30-300 pixels in each horizontal line and from 30-400 pixels vertically (lines).

An average luminosity is first calculated that is assigned to the topmost left corner pixel of each calibrated image block. The pixel indicated by the filled cell of FIG. 6 is used as the "pixel of interest" for this average luminosity calculation. Average luminosity is calculated by using the pixels neighboring this pixel of interest. Most digital camera photo-sensors, including the one used in this calibration procedure, employ two types of photo-sensor rows, as previously described with respect to FIGS. 3A-3C. The first being a row of RGRGRG (R=Red, G=Green and B=Blue) color sensitive photo-sensor elements, and the second being a row of GB G B G B color sensitive photo-sensor elements. The first type is depicted in FIG. 6 bordered by a frame, and the second is depicted in FIG. 6 without a frame. In order to calculate an average luminosity for a given pixel of the image, it is therefore necessary to read, and average, the intensity data from neighboring pixels in photo-sensor rows of like composition. This means that the pixels in rows bordered by a frame are averaged with corresponding pixels in other rows also bordered by a frame, and pixels in rows not bordered by a frame are averaged with corresponding pixels in other rows also not bordered by a frame. Specifically, this calls for pixels in the row of FIG. 6 that contain the pixel of interest and is bordered by a frame to be averaged on a corresponding pixel-by-pixel basis with the rows above and below it that are also bordered by frames. Every pixel of every line is preferably averaged. This is important because it is necessary to assure that the green component in each row is fully represented in the average luminosity calculation. Also note that when a pixel, for which an average luminosity must be calculated, is an edge pixel of the image, less pixels are taken into the average. Therefore, if this pixel is on a left edge of the image, only the neighbors on the right are included in the average.

Although the following discussion of "Slope Calculation" and the previous discussion of "Average Luminosity" does not specifically call out the use of separate average luminosity and separate block slope calculations for each primary color, this embodiment can be implemented in this manner.

In a digital camera, taken as an example, the non-uniform light response of a lens or a photo-sensor can cause an image to be stored and displayed with a different light intensity at its center than at its corners. This intensity often changes in both horizontal and vertical directions, such that it is lower at the start of a horizontal line or a vertical column than in the center of the line or column, and once again higher at the end of the line or column. In order to capture, store and display an image with a uniform luminosity at the time a scene is captured, these changes of luminosity are measured at calibration time, and then used to subsequently compensate for these changes.

In the calibration procedure employed, luminosity changes are measured by calculating a dX slope, a dY slope and a second partial slope dXY in every block. Thus a dX slope of a block represents the change of light intensity across the top line of pixels of the block and the dXY slope represents the change of dX slope between successive lines, going from top to bottom lines of pixels of a block. For example, the luminosity change of line i of the block is represented by a sum of dX slope with i*dXY slope of the block. The dY slope represents the luminosity change in the vertical direction between the successive blocks that comprise the first column of the image.

The slopes dX, dY and dXY are calculated for each block of the image by first finding the image block with the maximum average luminosity of the image, and dividing this average maximum luminosity value by the average luminosity of the image block of interest. The resulting ratio is referred to as "gain".

The algorithm to calculate dX, dY and dXY slopes creates three slope tables:
1) HGST (Horizontal Gain Slope Table)—A dX slope table, which has 128 entries, each entry of 22 bit (1 sign, 21 fraction).
2) VGST2 (Vertical Gain Slope Table)—A dXY slope table, which has 128 entries, each entry is of 17 bit wide (1 sign bits, 16 fraction).
3) VGST1 (Vertical Gain Slope Table)—A dY slope table, which has 8 entries, each entry is of 22 bit wide (1 sign, 21 fraction).

The algorithm also supplies a "basic gain". Basic gain is the gain of the first block of the image and it subsequently used in the image correction process as the gain factor for the top left pixel ($X_0, Y_0$) of the image. The gain is given in a 26 bit entry (2 integral, 24 fraction).

The calibration algorithm may be described in more detail, as follows:
1) First the maximum average luminosity is found (after the average luminosity of every block is calculated).
2) The basic gain is calculated using the maximum average luminosity.
3) For each block of the image dX, dY and dXY slopes are calculated. These slopes are calculated in a following way:
First Block of First Line:
a) The dX slope is calculated as $(Gain_B-Basic\_gain)/D_{AB}$.
b) The dY slope is calculated as $(Gain_C-Basic\_gain)/D_{AC}$.
For both slopes, Basic_gain has a value of $Gain_A$ (see FIG. 5).
First Block of Line i:
a) The dX slope is calculated as $(Gain_B-Basic\_gain_{(i)})/D_{AB}$
b) The dY slope is calculated as $(Gain_C-Basic\_gain_{(i)})/D_{AC}$
For both slopes $Basic\_gain_{(i)}$ is calculated as $(Basic\_gain_{(i-1)}+dY_{(i-1)}*Height_{(i-1)})$
Block j of Line i:
a) The dX slope is calculated as $(Gain_B-Basic\_gain_{(j)})/D_{AB}$, where $Basic\_gain_{(j)}$ is calculated as $(Basic\_gain_{(j-1)}+dX_{(j-1)}*Width_{(j-1)})$
For each block j in line i we calculate its dXY slope by $(dX_{(i+1)}-dX_{(i)})/D_{AC}$.
4) The created slope tables and the basic gain is stored in a digital camera's nonvolitile memory, 49 of FIGS. 1 and 2, for example, during the manufacturing process, and subsequently used to compensate for shading non-uniformities as previously described.

CONCLUSION

Although the present invention has been described with respect to certain embodiments, it will be understood that the invention is entitled to protection within the full scope of the appended claims.

The invention claimed is:

1. An imaging device, comprising:
an optical sensor having a multi-dimensional array of photosensitive pixels, wherein the array of photosensitive pixels are scanned to output data representative of a shading intensity pattern superimposed on an image;
a memory for storing data, including correction data for at least one color component for the image, wherein the correction data including a plurality of slopes of the shading intensity pattern between pixels across at least one block having a plurality of pixels in both rows and columns of the array of photosensitive pixels; and
a circuit for compensating the output data of the photosensitive pixels with the correction data slopes of the shading intensity pattern between pixels, wherein the compensation of the output data of photosensitive pixels in the array with the correction data slopes of the shading intensity pattern between pixels provide correction for the shading pattern superimposed on the image.

2. The imaging device of claim 1, wherein the correction data stored in the memory for the at least one block further includes a first rate of change of the shading intensity pattern along photosensitive pixels in the row direction and a second rate of change of the shading intensity pattern along photosensitive pixels in the column direction.

3. The imaging device of claim 1, wherein compensating is performed for the photosensitive pixels as the data is being outputted from the array of photosensitive pixels.

4. The imaging device of claim 1, wherein the shading intensity pattern includes at least one intensity variation introduced by at least one of the following:
one or more lenses directing the image onto the optical sensor, the photosensitive pixel array itself, or light reflection off at least one internal surface of an enclosure which houses at least one of the one or more lenses or the array of photosensitive pixels.

5. The imaging device of claim 1, wherein the image device further comprises a circuit for calibrating the correction data with a superimposition of at least a portion of a previously determined shading intensity pattern between pixels for an image having a uniform intensity there across.

6. A processor readable non-transitory storage media that includes a plurality of executable instructions, wherein the execution of the instructions enables actions for compensating data obtained from a multi-dimensional array of photosensitive pixels for a shading intensity pattern superimposed on an image, comprising:
storing in correction data for at least one color component for the image, wherein the correction data including a plurality of slopes of the shading intensity pattern between pixels across at least one block having a plurality of pixels in both rows and columns of the array of photosensitive pixels; and
compensating the output data of the photosensitive pixels with the correction data slopes of the shading intensity pattern between pixels, wherein the compensation of the output data of photosensitive pixels in the array with the correction data slopes of the shading intensity pattern between pixels provide correction for the shading pattern superimposed on the image.

7. The processor readable non-transitory storage media of claim 6, wherein the storing in the correction data for the at least one block further includes a first rate of change of the shading intensity pattern along photosensitive pixels in the row direction and a second rate of change of the shading intensity pattern along photosensitive pixels in the column direction.

8. The processor readable non-transitory storage media of claim 6, wherein the shading intensity pattern includes at least one intensity variation introduced by at least one of the following:
one or more lenses directing the image onto an optical sensor, the photosensitive pixel array itself, or light reflection off at least one internal surface of an enclosure which houses at least one of the one or more lenses or the array of photosensitive pixels.

9. The processor readable non-transitory storage media of claim 6, wherein the execution of the instructions further enables actions for calibrating the correction data with a superimposition of at least a portion of a previously determined shading intensity pattern between pixels for an image having a uniform intensity there across.

10. An integrated circuit that includes a plurality of circuits capable of processing output data from photosensitive pixels in an array, wherein the output data is representative of a scanned shading pattern superimposed on an image that is incident upon the array of photosensitive pixels, comprising:

a first circuit for storing data, including correction data for at least one color component for the image, wherein the correction data including a plurality of slopes of the shading intensity pattern between pixels across at least one block having a plurality of pixels in both rows and columns of the array of photosensitive pixels; and a second circuit for compensating the output data of the photosensitive pixels with the correction data slopes of the shading intensity pattern between pixels, wherein the compensation of the output data of photosensitive pixels in the array with the correction data slopes of the shading intensity pattern between pixels provide correction for the shading pattern superimposed on the image.

11. The integrated circuit of claim 10, wherein the storing of correction data for the at least one block further includes a first rate of change of the shading intensity pattern along photosensitive pixels in the row direction and a second rate of change of the shading intensity pattern along photosensitive pixels in the column direction.

12. The integrated circuit of claim 10, wherein the shading intensity pattern includes at least one intensity variation introduced by at, least one of the following: one or more lenses directing the image onto an optical sensor, the photosensitive pixel array itself, or light reflection off at least one internal surface of an enclosure which houses at least one of the one or more lenses or the array of photosensitive pixels.

13. The integrated circuit of claim 10, wherein the integrated circuit further comprises a circuit for calibrating the correction data with a superimposition of at least a portion of a previously determined shading intensity pattern between pixels for an image having a uniform intensity there across.

14. A method of compensating data obtained from a multi-dimensional array of photosensitive pixels for a shading intensity pattern superimposed on an image, comprising:

storing the following in a memory, correction data for at least one color component for the image, wherein the correction data including a plurality of slopes of the shading intensity pattern between pixels across at least one block having a plurality of pixels in both rows and columns of the array of photosensitive pixels; and compensating the data obtained from the photosensitive pixels with the correction data slopes of the shading intensity pattern between pixels, wherein the compensation of the data obtained from the photosensitive pixels in the array with the correction data slopes of the shading intensity pattern between pixels provide correction for the shading pattern superimposed on the image.

15. The method of claim 14, wherein the storing of the correction data for the at least one block further includes a first rate of change of the shading intensity pattern along photosensitive pixels in the row direction and a second rate of change of the shading intensity pattern along photosensitive pixels in the column direction.

16. The method of claim 14, wherein compensating is performed for the photosensitive pixels as the data is being outputted from the array of photosensitive pixels.

17. The method of claim 14, wherein the shading intensity pattern includes at least one intensity variation introduced by at least one of the following:

one or more lenses directing the image onto an optical sensor, the photosensitive pixel array itself, or light reflection off at least one internal surface of an enclosure which houses at least one of the one or more lenses or the array of photosensitive pixels.

18. The method of claim 14, wherein the method further comprises the step of calibrating the correction data with a superimposition of at least a portion of a previously determined shading intensity pattern between pixels for an image having a uniform intensity there across.

\* \* \* \* \*

UNITED STATES PATENT AND TRADEMARK OFFICE
CERTIFICATE OF CORRECTION

PATENT NO. : 8,218,037 B2  
APPLICATION NO. : 12/903114  
DATED : July 10, 2012  
INVENTOR(S) : Victor Pinto et al.

It is certified that error appears in the above-identified patent and that said Letters Patent is hereby corrected as shown below:

On the cover page, item (57), under "Abstract", in column 2, line 3, delete "Image image" and insert -- image --, therefor.

In column 17, line 31, in Claim 12, delete "at," and insert -- at --, therefor.

Signed and Sealed this  
Fourth Day of September, 2012

David J. Kappos  
*Director of the United States Patent and Trademark Office*